United States Patent
Noblitt

(10) Patent No.: US 10,975,344 B2
(45) Date of Patent: Apr. 13, 2021

(54) METHODS AND APPARATUS FOR LIQUID PRESERVATION

(71) Applicant: Daniel J. Noblitt, Scottsdale, AZ (US)

(72) Inventor: Daniel J. Noblitt, Scottsdale, AZ (US)

(*) Notice: Subject to any disclaimer, the term of this patent is extended or adjusted under 35 U.S.C. 154(b) by 0 days.

(21) Appl. No.: 16/222,505

(22) Filed: Dec. 17, 2018

(65) Prior Publication Data
US 2019/0116997 A1    Apr. 25, 2019

Related U.S. Application Data

(63) Continuation of application No. 15/417,963, filed on Jan. 27, 2017, now Pat. No. 10,154,745.

(60) Provisional application No. 62/287,808, filed on Jan. 27, 2016.

(51) Int. Cl.
| | | |
|---|---|---|
| *C12G 1/00* | (2019.01) | |
| *A47G 19/22* | (2006.01) | |
| *B65D 81/20* | (2006.01) | |
| *B65D 81/24* | (2006.01) | |

(52) U.S. Cl.
CPC ............... *C12G 1/00* (2013.01); *A47G 19/22* (2013.01); *A47G 2400/045* (2013.01); *B65D 81/2038* (2013.01); *B65D 81/245* (2013.01)

(58) Field of Classification Search
CPC ........ A47G 19/22; A47G 2400/04–045; C12G 1/00–08; C12G 1/0206; B65D 81/245; B65D 81/2038; B65D 83/0033; B65D 83/0055; B65D 83/0094; C12H 1/22; C12H 1/14; C12C 11/00; C12C 13/10; F28D 1/06; F28F 3/12; F28F 21/062; F28F 21/065; F28F 1/00; B23P 15/26; Y10T 29/4935

USPC ........ 220/694, 695, 697, 703–719, 729, 735; 215/386–388, 390, 391

See application file for complete search history.

(56) References Cited

U.S. PATENT DOCUMENTS

| | | | | |
|---|---|---|---|---|
| 3,834,576 A | * | 9/1974 | Heisterberg | F17B 1/00 220/220 |
| 4,532,800 A | * | 8/1985 | Coleman | G01F 23/72 116/228 |
| 4,552,090 A | * | 11/1985 | Coleman | G01F 23/72 116/204 |
| 4,969,391 A | * | 11/1990 | Haulot | C12G 1/0216 426/11 |
| 6,279,457 B1 | * | 8/2001 | Francia | C12G 1/0216 99/277 |

(Continued)

OTHER PUBLICATIONS

Private Preserve—Wine Preservation Spray, accessed www.directshoppingcenter.com Apr. 5, 2017.

(Continued)

*Primary Examiner* — Kareen K Thomas
(74) *Attorney, Agent, or Firm* — Daniel J. Noblitt

(57) ABSTRACT

Methods and apparatus for liquid preservation according to various aspects of the present invention may comprise a vessel and a displacer. The displacer may be disposed in an interior volume defined by an interior surface of the vessel. The displacer may change the volume of the interior volume. An aperture at an apex of the displacer or vessel may allow air to escape from the interior volume as the displacer decreases the volume of the interior volume. An at least partially transparent displacement indicator may be positioned atop the aperture.

19 Claims, 3 Drawing Sheets

(56) References Cited

U.S. PATENT DOCUMENTS

| | | | | |
|---|---|---|---|---|
| 6,631,732 | B1 * | 10/2003 | Koster | C12G 1/0216 |
| | | | | 137/571 |
| 6,805,885 | B2 * | 10/2004 | Francia | C12G 1/0216 |
| | | | | 426/11 |
| 7,353,750 | B2 * | 4/2008 | Francia | C12G 1/0216 |
| | | | | 99/277 |
| 8,579,138 | B2 | 11/2013 | Jamison et al. | |
| 2011/0114654 | A1 * | 5/2011 | Stern | A47G 19/2205 |
| | | | | 220/703 |
| 2014/0082914 | A1 * | 3/2014 | Flores | A47G 19/065 |
| | | | | 29/428 |
| 2015/0336785 | A1 * | 11/2015 | Rege | B67D 1/04 |
| | | | | 222/1 |
| 2015/0343400 | A1 | 12/2015 | Stevenson et al. | |

OTHER PUBLICATIONS

Private Preserve—Wine Preserver, accessed www.alambika.ca Apr. 5, 2017.
Savino Wine Saver Carafe, accessed www.thegrommet.com Apr. 5, 2017.
Le Creuset Wine Pump, accessed www.amazon.com Apr. 5, 2017.
Brookstone Automatic Wine Preserver, accessed www.bedbathandbeyond.com Apr. 5, 2017.
Savino Wine Saving Carafe, accessed www.savinowine.com Apr. 5, 2017.
Air Cork Wine Preserver, accessed www.amazon.com Apr. 5, 2017.

* cited by examiner

METHODS AND APPARATUS FOR LIQUID PRESERVATION

CROSS-REFERENCE TO RELATED APPLICATION

This application is a continuation of U.S. patent application Ser. No. 15/417,963, filed Jan. 27, 2017, which claims the benefit of U.S. Provisional Patent Application No. 62/287,808, filed Jan. 27, 2016, and incorporates the disclosure of such application by reference.

BACKGROUND OF INVENTION

Exposure to air eventually degrades the quality of some fluids. For example, exposing wine to air over time allows oxidation, which degrades its taste and quality. When a bottle is opened, air enters into the head space (i.e., the internal volume of beverage bottle not occupied by the remaining beverage). Therefore, even if the bottle is later closed, the air inside the headspace oxidizes the remaining wine.

SUMMARY OF THE INVENTION

Methods and apparatus for liquid preservation according to various aspects of the present invention may comprise a vessel and a displacer. The displacer may be disposed in an interior volume defined by an interior surface of the vessel. The displacer may change the volume of the interior volume. An aperture at an apex of the displacer or vessel may allow air to escape from the interior volume as the displacer decreases the volume of the interior volume. An at least partially transparent displacement indicator may be positioned atop the aperture.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

Various aspects of the present invention may be described in terms of functional components and various processing steps. Such functional components may be realized by any number of components configured to perform the specified functions and achieve the various results. For example, exemplary embodiments of the present invention may employ various components, e.g., vessel, displacer, valve, stopper, seal, and the like, which may carry out a variety of functions. In addition, various aspects of the present invention may be practiced in conjunction with any suitable liquids, materials, displacement mechanisms, vessels, and configurations, and the systems and methods described are merely exemplary applications for the invention. Further, exemplary embodiments of the present invention may employ any number of conventional techniques for placing liquid into the vessel and displacing air from within the vessel.

Figure 1:
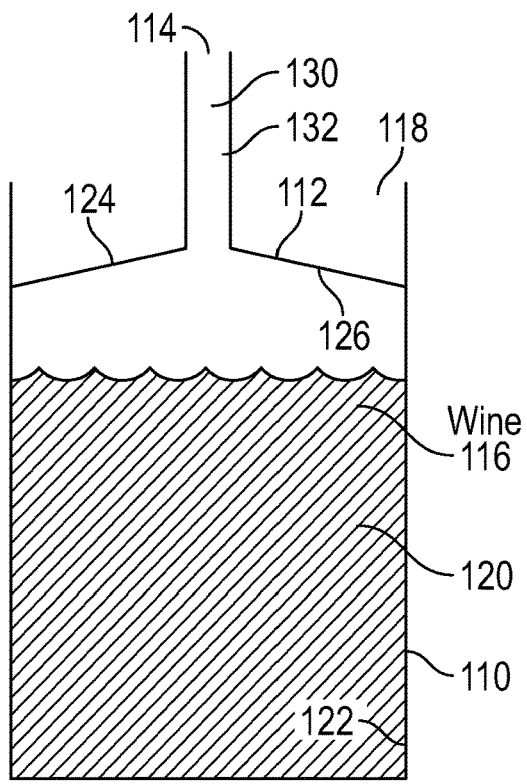
FIGS. 1 through 3 illustrate an exemplary apparatus for liquid preservation comprising a vertically movable displacer within a vessel.
Figure 4:
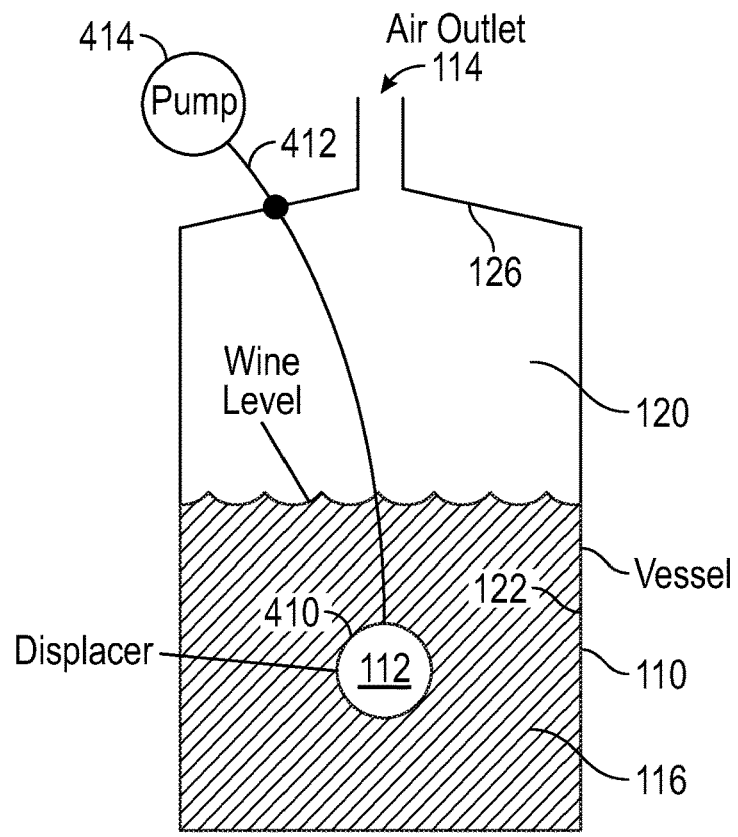
FIGS. 4 through 6 illustrate an exemplary apparatus for liquid preservation comprising a displacer to be inflated within the liquid contained in a vessel.

Referring to FIGS. 1 and 4, a liquid container according to various aspects of the present invention may comprise a vessel 110 and a displacer 112. The vessel 110 holds a liquid 116 to be isolated from the ambient environment. The displacer 112 changes the volume within the vessel 110 to drive air or other fluid out of the vessel 110, such as through an air outlet 114.

The vessel 110 may hold the liquid 116. In one embodiment, the liquid 116 may be wine, but may comprise another liquid 116 that deteriorates or otherwise reacts unfavorably to exposure to air. The vessel 110 may comprise any appropriate size or shape for the particular application. For example, the vessel 110 may at least partially define an interior volume 120 having sufficient volume to accommodate a normal bottle of wine, such as at least 750 ml. In other applications, the vessel 110 may define any suitable volume.

Figure 2:
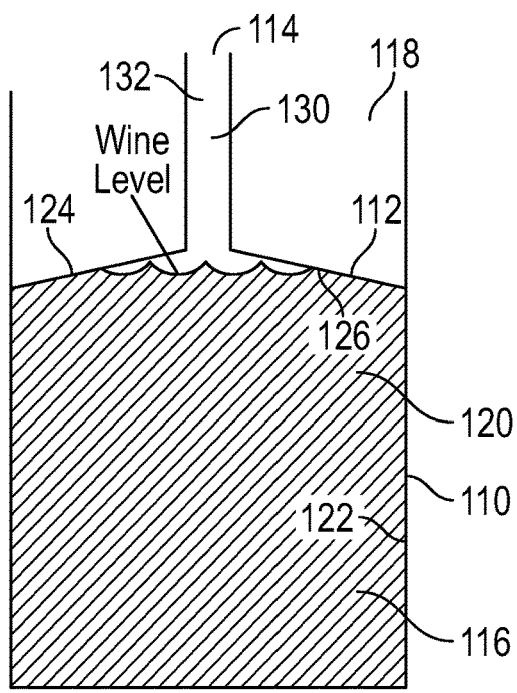
Figure 3:
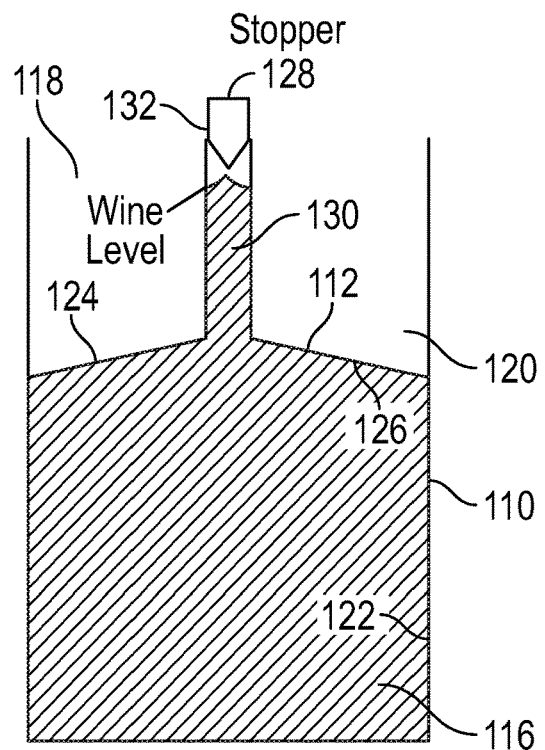

Referring to FIGS. 1 through 3, in one embodiment, the vessel 110 comprises a generally cylindrical vessel with a flat bottom to stand upright on a surface. The vessel 110 may also be configured to accept contents, such as via an open top 118 so that the liquid 116 may be poured into the vessel 110. Further, the vessel 110 may comprise any suitable material, such as a rigid material that retains its shape like a carafe, bottle, or jar, or a flexible material like for a bladder or bag. For liquids 116 to be preserved like wine, the vessel 110 may comprise or be lined with a material that does not significantly react with the liquid 116. In the present embodiment, the vessel 110 comprises a material that is effectively inert in contact with wine, such as glass, porcelain, or crystal. In some embodiments, the vessel 110 may be lined with a flexible bladder to contain the liquid 116, such as to avoid leakage out of the vessel 110. The interior volume 120 may be at least partially defined by an interior surface 122 of the vessel 110.

The displacer 112 displaces a portion of the interior volume 120 of the vessel 110 to adjust the volume within the vessel 110 and drive the air out of the interior volume 120. The displacer 112 may comprise any appropriate system for reducing the volume of the interior volume 120. The displacer 112 may comprise a separate component that cooperates with the vessel 110 or may be integrated into the vessel 110.

For example, referring to FIGS. 1-3, in one exemplary embodiment, the displacer 112 comprises a cover 124 that fits over the liquid 116 in the vessel 110. The cover 124 and vessel 110 may move relative to one another to change the volume of the vessel's 110 interior volume 120. For example, the cover 124 may fit into the open top 118 of the vessel 110 to cover the liquid 116.

The cover 124 may be moved vertically within the vessel 110 to change the volume of the interior volume 120. For example, the cover 124 may slide up and down along the interior surface 122 of the vessel 110. Alternatively, the outer rim of the cover 124 and the vessel 110's interior wall may include threads that engage each other to allow the cover 124 to move vertically within the vessel 110 using a screwing motion.

The cover 124 may include a seal to seal the contents of the interior volume 120 within. For example, the outer rim of the cover 124 may include one or more resilient flanges extending radially away from the outer rim and engaging the interior wall of the vessel 110. The seal may also or alternatively include one or more resilient o-rings around the outer rim of the cover 124, such as seated in one or more corresponding grooves formed in the outer rim of the cover 124.

The displacer 112 and/or vessel 110 may drive air out of the interior volume 120, such as from the headspace of air between the liquid 116 in the interior volume 120 and the top of the interior volume 120. The displacer 112, vessel 110, and/or air outlet 114 may be configured in any suitable manner to remove air from the interior volume 120. For example, in one embodiment, the cover 124 may comprise an inverted funnel having an interior surface 126 that slopes downward radially from the center, such that the center is highest point and the outer edge is lowest point of a generally conical profile.

In the present embodiment, the air outlet 114 is formed at the apex of the cover 124. As the cover 124 descends towards and onto the liquid 116, the interior volume 120 decreases, and air in the headspace is directed up and out through the air outlet 114. Eventually, substantially all of the air may escape through the air outlet 114. As a result, only a small area of contained liquid 116 is exposed at the top of the air outlet 114. The exposed portion of the contained liquid 116 may be further reduced by covering the air outlet 114 when the air has been removed with a stopper 128, such as with a cap, cork, and/or one-way valve that allows egress from the interior volume 120 but inhibits ingress. In one embodiment, the valve may facilitate passage of gas but inhibit liquid 116 transfer.

The displacer interior surface 126 slope may be any appropriate angle, such as for aesthetic or practical purposes. For example, the displacer interior surface 126 slope angle may be selected to balance the weight of the cover 124 with the liquid 116 displaced by the cover 124. In one embodiment, the slope angle is selected such that the weight of the liquid 116 above the outer rim of the cover 124 when the cover 124 is fully lowered into the liquid 116 is about the same as the weight of the cover 124. Displacing the same weight of liquid 116 balances the weight of the cover 124 with its buoyancy in the liquid 116 such that the net vertical force on the cover 124 is substantially null.

In some embodiments, the cover 124 weight might be greater than its buoyancy to generate pressure within the interior volume 120. For example, the cover 124 weight and buoyancy may be selected such that the pressure on the liquid 116 is enough to activate a one-way valve on the air outlet 114 to release air, but not enough to overcome the seal along the edge of the cover 124 or drive anything but air through the one-way valve.

The liquid container may further include a displacement indicator 130 to indicate the degree of air displacement from within the interior volume 120. For example, the displacement indicator 130 may comprise an at least partially transparent tube 132 extending from the apex of the cover 124. The liquid 116 level within the transparent tube 132 indicates whether all of the air has been driven from within the interior volume 120. The stopper 128 may be attached to the top of the tube 132 when the air displacement process is complete. If the tube 132 is flexible, a clamp or clip may be used to pinch the tube 132 closed. The tube 132 may be fully transparent, include a transparent portion such as a window, may be translucent, or may otherwise provide a visual indicator of the liquid 116 level within the displacement indicator 130.

Other embodiments of the displacer 112 are not positioned at the top of the vessel 110, but instead may be driven from other directions, such as the bottom or side. For example, the displacer 112 may comprise a bottom plate that moves up within the vessel 110 to decrease the volume of the interior volume 120 within the vessel 110. The top of the vessel 110 may include an apex with the air outlet 114, for example with a shape similar to the inverted funnel, but the top of the vessel 110 may be stationary instead of movable relative to the remainder of the vessel 110. In another embodiment, the displacer 112 is integrated into the vessel 110 wall itself. For example, a portion of the vessel 110 may be flexible to facilitate squeezing, collapsing, crumpling, or other shrinkage of the vessel 110 to reduce the volume of the interior volume 120 containing the liquid 116.

Figure 5:
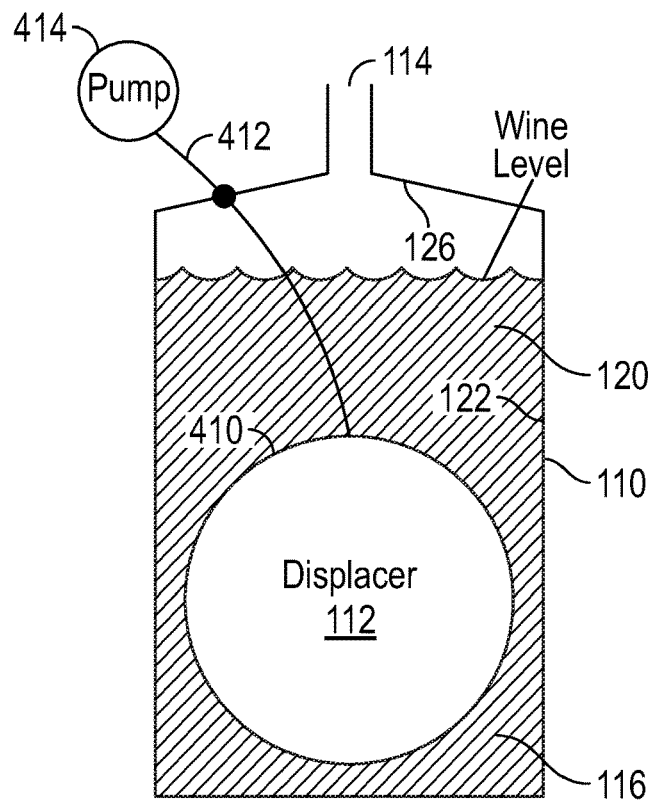
Figure 6:
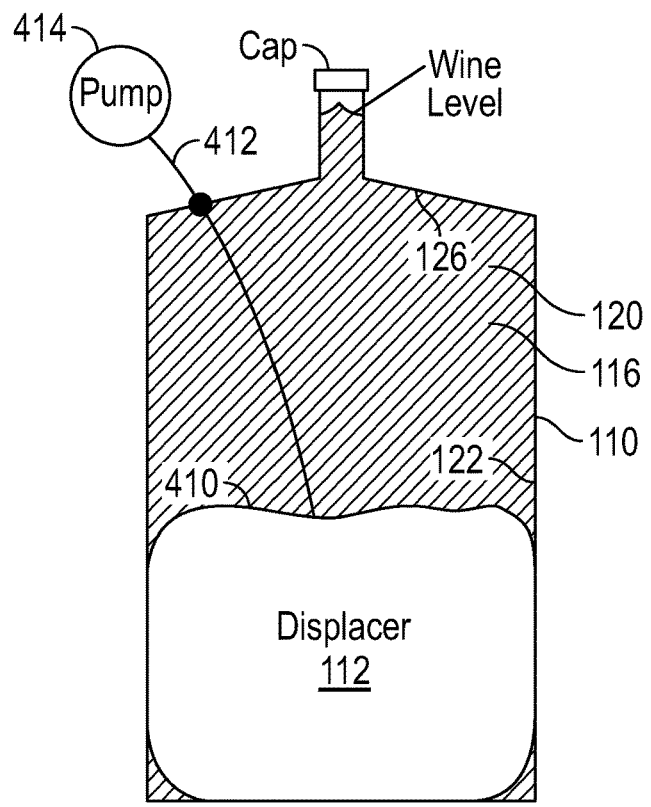

In another embodiment, referring to FIG. 4 through 6, the interior volume 120 of the vessel 110 may remain constant, but the portion available to be occupied by the liquid 116 may be reduced by an interior displacer 410 within the vessel 110 and the interior volume 120. The interior displacer 410 may comprise any suitable device for displacing space within the interior volume 120. In one embodiment, the interior displacer 410 comprises a balloon that may be inflated within the interior volume 120 to reduce the space that may be occupied by the liquid 116. Thus, as the balloon is inflated, the displaced liquid 116 drives air through the air outlet 114 until substantially all of the air is removed.

The balloon may be attached to the interior of the vessel 110 and/or interior volume 120, such as to the bottom of the vessel 110. To keep the balloon from floating in the liquid 116, the balloon may be weighted and/or filled with a relatively dense fluid, such as water. In addition, the balloon may be configured to permit fluid to flow around the balloon. For example, the balloon may include external ridges and/or bumps that can engage the interior surface 122 of the vessel 110 and maintain space for fluid to get around the balloon, for example to keep air from getting trapped under the balloon.

For example, the interior displacer 410 may comprise the balloon connected via a hose 412 to a fluid source, such as an air pump 414 or water source like a kitchen water tap. Fluid may be added into the balloon until the displacement indicator 130 indicates that the air has been substantially removed. The hose 412 may then be pinched off or otherwise substantially sealed, such as using a valve.

In one embodiment, the interior displacer 410 comprises a flexible balloon that is narrow enough to be inserted into a bottle, such as a conventional wine bottle, through the neck. In this embodiment, the vessel 110 comprises the wine bottle, and the displacement indicator 130 comprises the neck of the wine bottle. An exemplary hose 412 attached to the balloon may be stiff enough to drive the balloon towards the bottom of the bottle in opposition to the buoyancy of the balloon as it is inflated in the liquid 116 (i.e., wine in this case). As the balloon is inflated, the liquid 116 chases the air up through the neck and out of the bottle. When the liquid 116 approaches the top of the bottle, the top of the bottle may be sealed, for example using a stopper through which the hose 412 is disposed. Alternatively, the bottle may be sealed by inserting a conventional cork and pinching the hose between the cork and the interior wall of the bottle's neck, thus maintaining the inflation of the balloon.

In the foregoing specification, the invention has been described with reference to specific exemplary embodiments. Various modifications and changes may be made, however, without departing from the scope of the present invention as set forth in the claims. The specification and figures are illustrative, not restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise," "comprises," "comprising," "having," "including," "includes," or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

The invention claimed is:

1. An apparatus for preserving a liquid, comprising:
    a vessel, comprising:
        an open top; and
        an interior surface defining an interior volume to contain the liquid; and
    a displacer disposed within the vessel through the open top, comprising:
        an outer rim sealingly engaging the interior surface of the vessel;
        an aperture at an apex of the displacer; and
        an at least partially transparent displacement indicator positioned atop the aperture,
    wherein the displacer is selectably movable within the interior volume parallel to the interior surface and below the open top.

2. An apparatus for preserving a liquid according to claim 1, wherein a bottom surface of the displacer contacts the liquid and drives air above the liquid out of the interior through the displacement indicator as the displacer descends on top of the liquid.

3. An apparatus for preserving a liquid according to claim 1, wherein the displacement indicator includes a lower opening in fluid communication with the vessel interior via the aperture.

4. An apparatus for preserving a liquid according to claim 1, further comprising a stopper fitted over a top of the displacement indicator.

5. An apparatus for preserving a liquid according to claim 1, wherein the displacement indicator comprises a one-way valve facilitating fluid flow out of the interior.

6. An apparatus for preserving a liquid according to claim 1, wherein a weight of the displacer substantially equals a weight of the liquid displaced by the displacer when the displacer is fully descended into the liquid.

7. An apparatus for preserving a liquid according to claim 1, wherein a weight of the displacer is slightly greater than a buoyancy of the displacer.

8. An apparatus for preserving a liquid according to claim 1, further comprising a flexible bladder lining the interior surface and engaging the displacer.

9. An apparatus for preserving a liquid, comprising:
    a vessel comprising an interior surface defining an interior containing the liquid;
    a flexible bladder disposed within the interior;
    a displacer disposed within the vessel, wherein the displacer:
        includes a movable surface subjecting the liquid to compression within the interior, driving air out of the vessel interior, and changing a level of the liquid; and
    a displacement indicator in fluid communication with the vessel interior and including a portion displaying the level of the liquid.

10. An apparatus for preserving a liquid according to claim 9, further comprising a stopper fitted over a top of the displacement indicator.

11. An apparatus for preserving a liquid according to claim 9, wherein the displacement indicator comprises a one-way valve facilitating fluid flow out of the interior.

12. An apparatus for preserving a liquid according to claim 9, wherein the flexible bladder includes the displacer.

13. An apparatus for preserving a liquid, comprising:
    a vessel, comprising:
        an open top; and
        a cylindrical interior surface defining an interior space to contain the a liquid;
    a substantially conical displacer disposed within the vessel through the open top, comprising:
        an outer rim sealingly engaging the interior surface of the vessel, wherein a vertex of the conical displacer is above the outer rim; and
        an aperture at the vertex of the conical displacer;
    wherein:
        the displacer is selectably movable vertically within the interior space parallel to the interior surface and below the open top; and
        a movement of the displacer changes the volume of the interior space; and
    a displacement indicator positioned atop the aperture and comprising a tube comprising a first end and a second end, wherein:
        the first end is in fluid communication with the interior space via the aperture;
        the second end is open; and
        a descent of the displacer into the liquid forces the liquid through the aperture into the displacement indicator.

14. An apparatus for preserving a liquid according to claim 13, wherein a bottom surface of the displacer contacts the liquid and drives air above the liquid out of the interior through the displacement indicator as the displacer descends on top of the liquid.

15. An apparatus for preserving a liquid according to claim 13, further comprising a stopper fitted over a top of the displacement indicator.

16. An apparatus for preserving a liquid according to claim 13, wherein the displacement indicator comprises a one-way valve facilitating fluid flow out of the interior.

17. An apparatus for preserving a liquid according to claim 13, wherein a weight of the displacer substantially equals a weight of the liquid displaced by the displacer when the displacer is fully descended into the liquid.

18. An apparatus for preserving a liquid according to claim 13, wherein a weight of the displacer is slightly greater than a buoyancy of the displacer.

19. An apparatus for preserving a liquid according to claim 13, further comprising a flexible bladder lining the interior surface and engaging the displacer.

* * * * *